March 8, 1966 N. B. WALES, JR 3,239,721

ELECTROMAGNETICALLY CONTROLLED READOUT DEVICE

Filed Feb. 8, 1961 5 Sheets-Sheet 1

INVENTOR.
NATHANIEL B. WALES JR.

BY George V. Hall

ATTORNEY

*INVENTOR.*
NATHANIEL B. WALES JR.
BY George V. Hall
ATTORNEY

INVENTOR.
NATHANIEL B. WALES JR.
BY George V. Hall
ATTORNEY

ELECTROMAGNETICALLY CONTROLLED READOUT DEVICE

INVENTOR.
NATHANIEL B. WALES JR.
BY George V. Hall
ATTORNEY

ELECTROMAGNETICALLY CONTROLLED READOUT DEVICE

Filed Feb. 8, 1961

INVENTOR
NATHANIEL B. WALES JR.
BY George V. Hall
ATTORNEY

United States Patent Office 3,239,721

Patented Mar. 8, 1966

3,239,721

ELECTROMAGNETICALLY CONTROLLED READOUT DEVICE

Nathaniel B. Wales, Jr., Sharon, Conn., assignor to Monroe International Corporation, a corporation of Delaware Filed Feb. 8, 1961, Ser. No. 88,244

15 Claims. (Cl. 317—123)

This application is a continuation in part of application Ser. No. 781,338 filed on Dec. 18, 1958, now abandoned. The invention relates to apparatus including magnetically restrained armatures and means for selectively releasing said armatures in response to current pulses indicative of stored data.

A principal object of the invention is to provide apparatus of the above character wherein the means for selectively releasing said armatures can respond to fractional millisecond current pulses.

A specific object of the invention is to provide an electromechanical buffer memory which can respond to fractional millsecond current pulses.

A more specific object is to provide an electromechanical buffer memory comprising a matrix wherein a pattern of selectively positioned stops or interposers are particularly adapted to control the positioning of a plurality of indicia, printing wheels, switches, mechanical actuators or accumulators.

Another specific object is to provide a single row of stops which may be selectively positioned at selected time intervals to control the positioning of a plurality of indicia, printing wheels, etc.

Other objects will be evident from the following description.

The character of the devices taught by my invention permits the use of fractional millisecond current pulses such as may be generated from magnetic drums, or tapes, or other high speed computing systems to cause rapid release of the magnetically restrained armatures for positioning by stored mechanical energy.

One form of my invention depends on the setting up of a matrix array of magnetic pole pieces each of which is supplied with a source of biasing magnetomotive force from one or more permanent magnets or electromagnets. Associated with each of said poles is a movable armature adapted to be attracted to its pole by a magnetic force which is appreciable in magnitude only at very short ranges such as $\frac{1}{1000}$ of an inch. Each armature is urged by a biasing mechanical force such as by a spring, or by friction against a moving member, to break the foregoing magnetic biasing attractive bond and to move away from its pole to an actuated or released position. By proper design, the net magnetomotive force impressed on a given pole at which the said mechanical biasing force will just break the resultant magnetic bond can be made to be very constant and repetitive.

My invention teaches the use of a means to modulate the said biasing magnetomotive force for each separate row of the matrix, and also a means to modulate the said biasing magnetomotive force for each separate column of the matrix. By choosing the polarity of these modulations so as to reduce the biasing magnetic force and by choosing the magnitude of flux diminution for a single row or column modulation means to be inadequate by itself to bring about the break-away level of flux in a given pole, then it is possible to cause the release of a selected address of armature by simultaneously superimposing the flux diminishing modulations of two flux modulating means corresponding to the row and column of the address. In this way a row modulator enables the armature of a given row to be released by its column modulator means, and vice versa.

The foregoing structure may be considered to be one having three states of magnetic equilibrium, namely: holding, enabled, and released.

By utilizing more than three states of equilibrium it is possible to impose conditions on the release of a matrix armature which make possible a decoding logical operation.

An important feature of my invention is that the row and column modulating means disclosed and claimed do not have any ohmic interconnection at the intersection of a row and column, thereby preventing sneak circuits, and obviating the use of diodes in the matrix.

Provision is made to mechanically restore the released magnets to their attracted holding position at the end of a cycle which includes the using of the information stored by the selective release of matrix armatures. In the case where the mechanical bias force is supplied by springs, this restoration also restores the mechanical energy released at the addressed armatures.

Another form of my invention depends on the setting up of a single row of magnetic pole pieces each of which is supplied with a source of biasing magnetomotive force from one or more permanent magnets. A movable armature is associated with each pole in the same manner as in the first said form of the invention. However, to release a given armature of the row, it is not necessary to reduce the magnetomotive force at each of the poles of the row, as in the first form, but only at the pole of said given armature.

Figure 1:
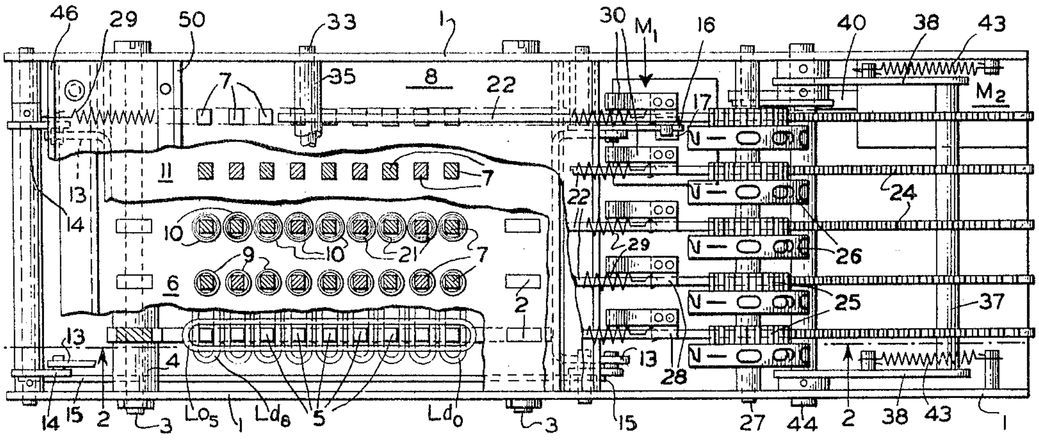
FIG. 1 is a plan view with parts broken away of one form of my invention as applied to a combination display and switching device for registering both visually and electrically five orders of decimal digits.
Figure 2:
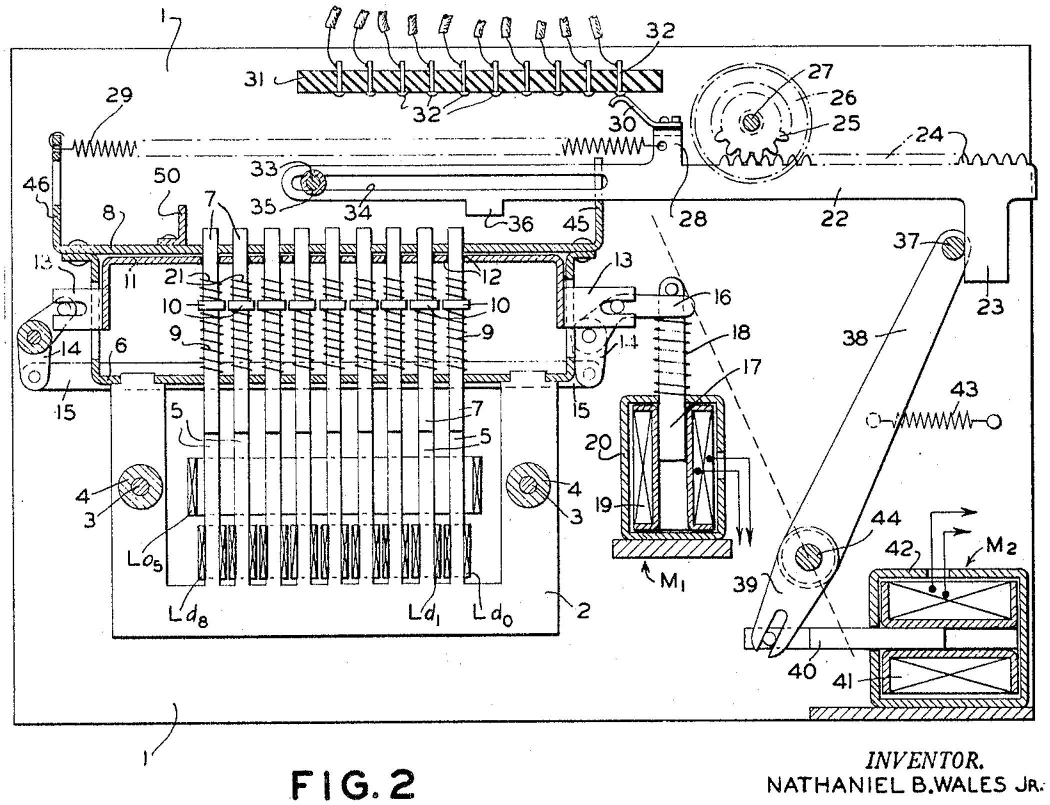
FIG. 2 is a vertical section taken on the line 2—2 of FIG. 1.

Referring to FIGS. 1 and 2, the five order decimal register mechanism comprises the two end plates 1 between which are mounted the five magnetic pole plates 2 by means of screws 3 and spacers 4. Each pole plate 2 has formed integral with it the nine magnetic pole fingers 5. Each pole finger 5 is embraced or linked at its root end by one of the nine elongated insulated coil windings $Ld_0$, $Ld_1$, $Ld_2$, $Ld_3$, $Ld_4$, $Ld_5$, $Ld_6$, $Ld_7$, or $Ld_8$, which run transversely of plates 2 each linking the corresponding fingers, thereby constituting the row coils. Conversely, each pole finger 5 is linked at its outer end by one of the five elongated insulated coil windings $Lo_1$, $Lo_2$, $Lo_3$, $Lo_4$, or $Lo_5$, which run from pole to pole within a given order plate 2 and thereby constitute column coils.

The outer ends of magnetic pole plates 2 make magnetic contact with the magnetic lower matrix plate 6 into which are slidably journaled the lower ends of armature pins 7. Pins 7 thus can complete a magnetic circuit including members 5, 2, 6, and 7 when any pin 7 is in contact with its pole finger 5. The upper ends of armature pins 7 are slidably journalled in the upper matrix plate 8. Each armature pin 7 is urged upward away from attraction to pole 5 by means of the uniform mechanical bias spring 9 acting on shoulder 10 integral with pin 7.

A restoring matrix plate 11 is slidably located intermediate between matrix plates 6 and 8, and is provided with clearance holes 12 which assure that the vertical restoring motion of plate 11 does not impose any frictional drag on armature pins 7.

Parallel vertical motion of plate 11 is provided by the cooperation of slotted ears 13 integral with plate 11, the bell cranks 14 which are journalled into end plates 1, the cross coupling links 15, actuator arm 16, solenoid armature 17, return spring 18, magnet coil 19 of magnet solenoid $M_1$, and magnet frame 20. The floating reset springs 21 on each pin 7 are each freely trapped between shoulder 10 and reset plate 11, so that when magnet $M_1$ is actuated, it will move plate 11 downward first through the release stroke distance, at which point it will start compressing bias springs 9 because springs 21 are designed to be stiffer than springs 9. Eventually, the foregoing compressing motion will bring each released armature 7 into positive contact with its pole in spite of slight manufacturing discrepancies in the lengths of pole pieces 5 and armature pins 7, thereby giving each armature 7 the opportunity to readhere to its magnetic pole piece 5. Deenergization of magnet $M_1$ allows spring 18 to return plate 11 to the position shown, thereby completing the restore cycle.

The interrogation portion of the register of FIGS. 1 and 2 consists of slide members 22 having rack teeth 24 engaging pinion teeth 25 integral with the display indica number drums 26 which are freely journalled on shaft 27 mounted between end plates 1. Slides 22 are guided at one end by slots 34 cooperating with rod 33, secured to end plates 1, and the spacers 35. At the other end, slides 22 are guided by a combed lip 45 integral with upper matrix plate 8. A bias spring 29 secured at one end to lip 46 of plate 8, and at the other end to lug 28 integral with slide 22, urges slide 22 toward the left of FIGS. 1 and 2. However, all five slides 22 are restrained for such leftward motion by the permissive rod 37 reacting on legs 23 of said slides. Rod 37 is secured to arms 38 which form an integral rotor together with shaft 44 which is journalled in end plates 1. A return spring 43 is able to overcome all five seeking springs 29 and normally maintain the system in the position shown.

Magnet solenoid $M_2$ comprising coil 41, armature 40, and frame 42 secured to end plate 1, is able to act, when energized, on slotted lever 39 which is secured to shaft 44, thereby moving permissive bar 37 in an arcuate path leftward to the dotted position shown. This in turn permits the slides 22 to move leftward until stop lugs 36 integral therewith encounter any armature pins 7 which have been released thus allowing their springs 9 to move their upper end into the paths of lugs 36. In this way the information selected by the matrix is displayed on drums 26.

It will be noted that there are nine pins 7 in each column corresponding to the digits 0 through 8 respectively. When the selection in any order comprises the digit 9, there will be no armature pin released in that order. This will provide for maximum excursion of the associated slide 22 to an arrested position by engagement of its lug 36 with a fixed stop 50 common to all of the slides.

In order to increase the utility of this memory device and to illustrate that it may be used for many output functions such as printing, accumulating, or actuating, a switch has been incorporated in the structure of FIGS. 1 and 2. This comprises a flexible wiper finger 30 secured to lug 28 of each slide 22 and which distributes frame potential to the ten contact buttons 32 secured to insulating plate 31 which in turn is fastened to the end frame plates 1. In this way five independent single pole ten throw switches are provided for reading out the information received by the selective release of armatures 7.

Figure 3:
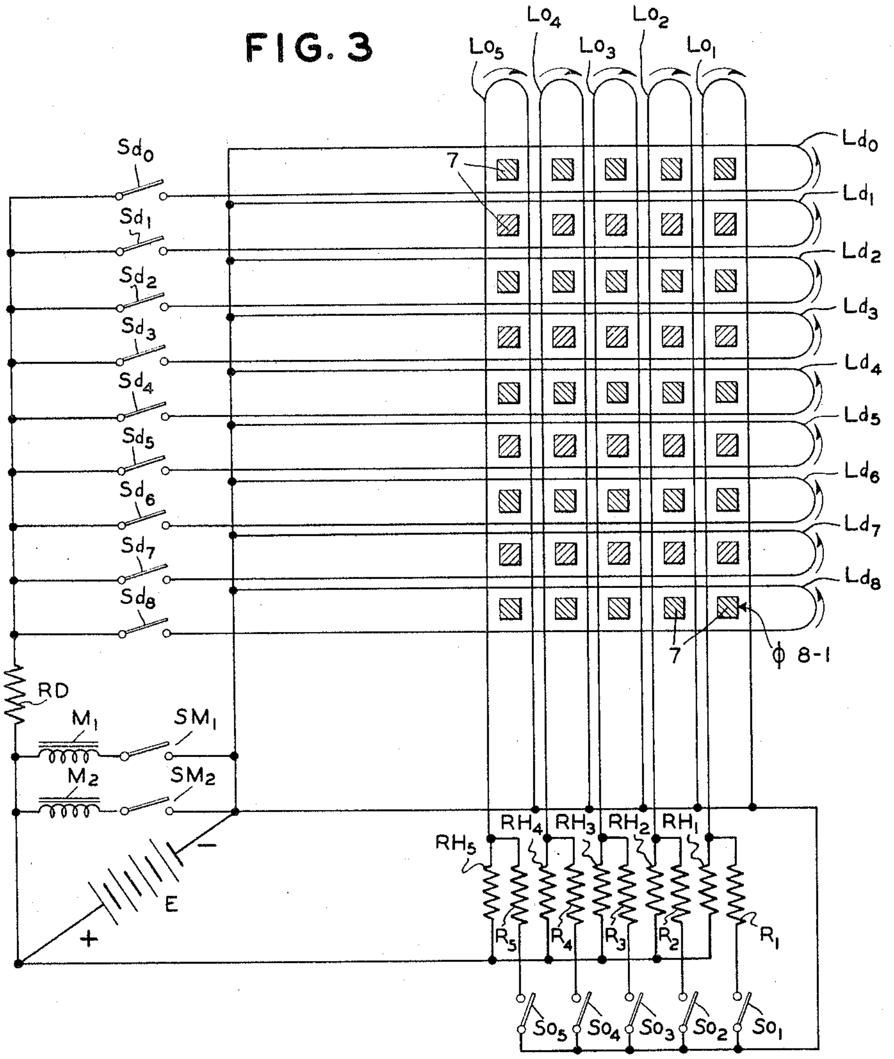
FIG. 3 is a schematic diagram of the electromechanical matrix disclosed in FIGS. 1 and 2.

Referring to the schematic diagram of FIG. 3 in conjunction with the corresponding parts shown in FIGS. 1 and 2, it may be seen that the actual many turn digit coils $Ld$ and order coils $Lo$ shown physically in FIGS. 1 and 2 are represented in FIG. 3 as a single turn for clarity. For instance, each of the above coils might consist of three hundred turns of .004 inch diameter wire for a pole area of $\frac{1}{256}$ sq. in.

Figure 4:
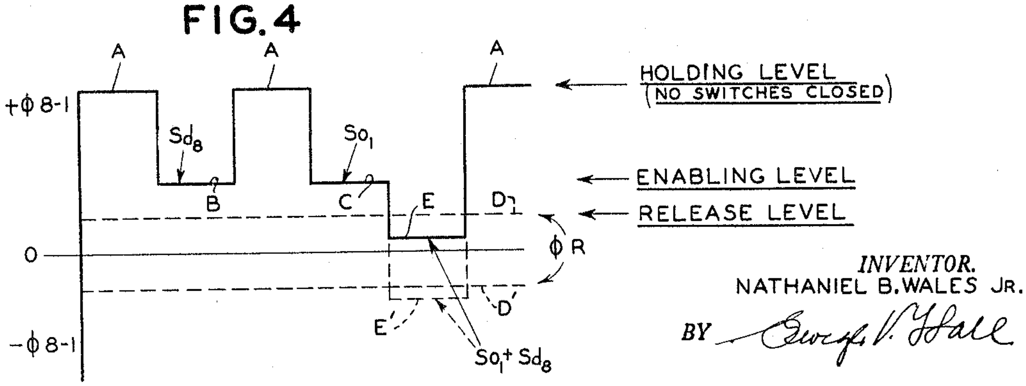
FIG. 4 is a graph showing the flux conditions effective on a matrix armature under different conditions of row and column modulation.

With none of the switches of FIG. 3 closed, the current source E can pass current through the paths $RH_1$–$Lo_1$, $RH_2$–$Lo_2$, $RH_3$–$Lo_3$, $RH_4$–$Lo_4$, and $RH_5$–$Lo_5$ thereby supplying the holding flux as shown graphically in FIG. 4 at A. It is to be noted that alternative to this method of supplying a magnetic holding bias to the armatures of the matrix it would be possible to make any leg of the magnetic circuit 5–2–6–7 (FIG. 2) either a permanent magnet or an electromagnet by energizing a single coil which could embrace such a leg. Although not economic, it is also evident that individual coils on each pole 5 or surrounding each armature 7 could accomplish the purpose of the above coils within the scope of my invention.

If now switch $Sd_8$ is opened and switch $So_1$ is closed, will flow from the battery E through coil $Ld_8$ via limiting resistor RD. However, as shown by the arrows, the current direction which produced the flux $\phi$8–1 in armature 7 shown at A in FIG. 4 is opposite to the current flowing in coil $Ld_8$ and consequently these magnetomotive forces will oppose one another, resulting in the reduced flux level shown at B in FIG. 4.

If now switch $Sd_8$ is opened and switch $So_1$ is closed, the amount of current in coil $Lo_1$ which had been supplying the flux level A will be diminished because of the parallel short circuiting path $So_1$–$R_1$–$Lo_1$–$So_1$ thus resulting, with the proper choice of resistors, in the lowered flux level C of FIG. 4 which could properly be made to be substantially the same value as level B. It is evident that the circuit of FIG. 4 illustrates two possible means for modulating the flux either for a row coordinate of a matrix or for a column coordinate of a matrix.

In one case holding flux was modulated by an opposing magnetomotive force linking one matrix coordinate, while in the other case the holding flux was modulated by ohmically diminishing the current in the holding flux coil for one coordinate.

In either case of the above single coordinate modulation, the lowering of the flux to level B or to level C was incapable by itself of releasing any armature since as shown in FIG. 4 the breakaway level of flux is designed to be within the range from D to D′ which is less than either level B or C.

If the springs 9 (FIG. 2) are powerful with respect to the residual flux of poles 5 and armatures 7 then the breakaway flux value $\phi R$ can be closely held at some positive flux value such as D. For less powerful springs it is possible that a slightly negative flux value would be necessary to give assured release.

If now both switches $Sd_8$ and $So_1$ are closed the addressed armature flux $\phi$8–1 will be driven to a level E of FIG. 4 thereby releasing armature 7 at the intersection of coils $Ld_8$ and $Lo_1$ since this is the only armature which is simultaneously subjected to the downward flux modulations due to these two coils. Evidently if the design release level was D′, the modulation means would have been designed to drive the flux level to point E′ of FIG. 4.

It may be seen then, that any single row can be enabled by the closure of the corresponding switch S*d* and simultaneously (in parallel) any selected ones of the column switches S*o* may be closed to produce only the selected memory of information. Conversely, if desired, any column could be enabled and parallel release of the selected rows could be effected without ambiguous or undesired registration.

In other words, the entry into the rows and columns of this matrix may be: serial-serial, serial-parallel, or parallel-serial, respectively, but not parallel-parallel without introducing ambiguity of input.

The operation of the device of FIGS. 1 to 4 is as follows: Switch $SM_1$ is closed and opened thereby restoring all armatures 7 to the holding position. Switch $Sd_0$ is closed and all orders of the input number which contain zero have their corresponding order switches S*o* closed and opened thereby releasing corresponding pins 7 in row O. The closure time of switches S*o* must be long enough so that springs 9 can move the pins 7 beyond the short control range of pole 5. In practice, this is found to be between 250 to 500 microseconds. Switch $Sd_0$ is now opened and switch $Sd_1$ is closed. All order switches S*o* are now pulsed (either serially or in parallel) and the process is repeated until all the row switches $Sd_0$ to $Sd_8$ have been used. The input information is now memorized in the form of a matrix pattern of released armatures 7.

In order to put this information into useful form, switch $SM_2$ is closed thereby energizing display actuator magnet $M_2$ and permitting slides 22 (FIGS. 1, 2) to seek out the released armatures 7 by means of stop lugs 36 and thereby display the input numbers on drums 26 and by the positions of switch fingers 30 on contacts 32. On the opening of switch $SM_2$ the display indications return to the zero or home index position by means of spring 43 (FIG. 2) thus preparing the device for a new cycle.

Figure 5:
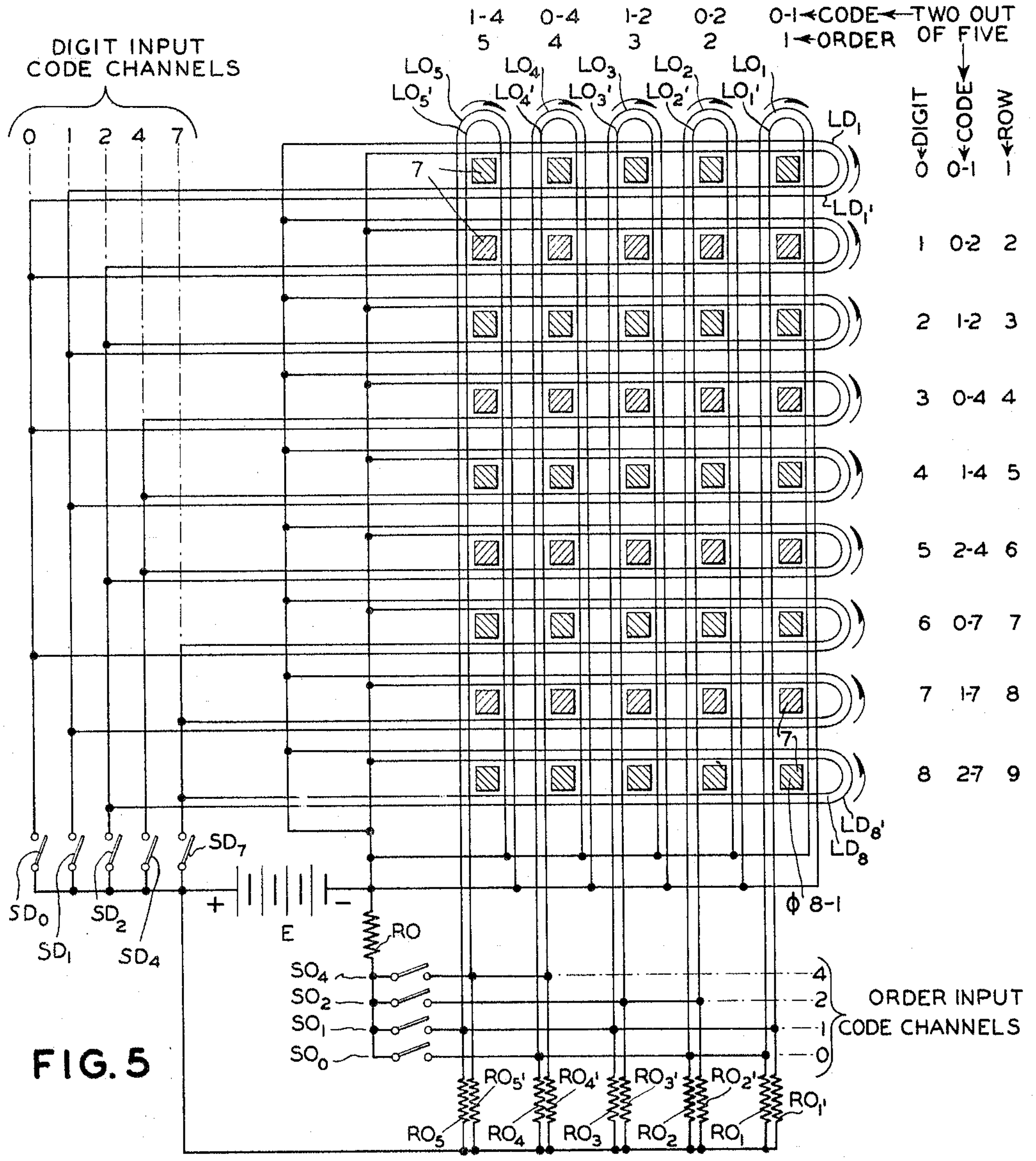
FIG. 5 is a schematic diagram of a matrix based on my invention using double modulator windings to decode four and five channel input information into a five order decimal array.
Figure 6:
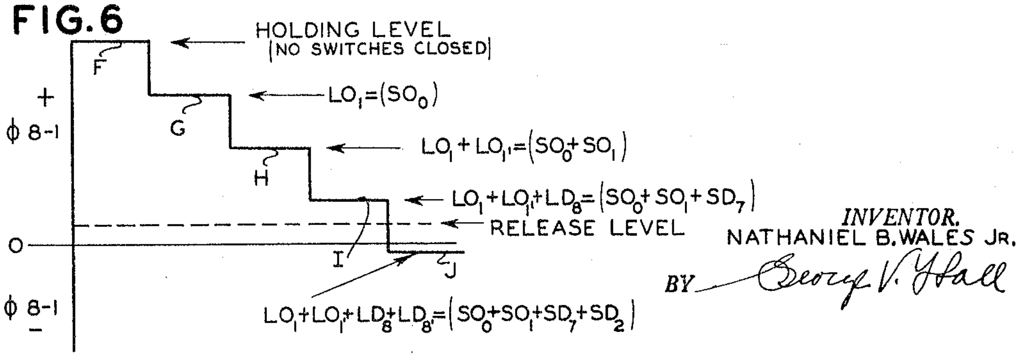
FIG. 6 is a flux diagram showing the five states of magnetic equilibrium applicable to the circuit of FIG. 5.

Referring to the decoding circuit illustrated in FIGS. 5 and 6, it may be seen that a similar conditioning or downward modulation of the flux at a given armature in the matrix is set up so that its release requires four conditions instead of the two conditions required in the matrix of FIG. 4.

This is accomplished by providing two windings for each row modulator means, and two windings for each column modulator. In this case, for instance, it is possible to use a two-out-of-five type of code using the values 0, 1, 2, 4, and 7 as the weights for each of five channels. The corresponding codes for each row and column are shown in FIG. 5. If, then, the uncommon leg of each of the two windings for a given row or column modulator coil is connected to those two members of an input bus corresponding to the code, then the activation of a pair of member leads of these two input busses will result in the release of the decoded corresponding armature.

Illustrating the operation of this type of decoding matrix, it may be seen that with no switches (FIGS. 5, 6) closed current will flow from battery E through holding resistors $RO_1$, $RO_2$, $RO_3$, $RO_4$, $RO_5$, and also resistors $RO_{1'}$, $RO_{2'}$, $RO_{3'}$, $RO_{4'}$, and $RO_{5'}$, and thence through their corresponding respective coils $LO_1$, $LO_2$, $LO_3$, $LO_4$, $LO_5$, and $LO_{1'}$, $LO_{2'}$, $LO_{3'}$, $LO_{4'}$, $LO_{5'}$, thereby holding down all armatures of the matrix. This is condition F of FIG. 6. If switches $SO_0$, $SO_1$, $SD_7$, and $SD_2$ are closed in sequence the flux conditions G, H, I, and J respectively will result.

Evidently then the digit input code (7+2=9) plus the order input code (0+1=1) has resulted in the decoded release of the armature having the address: ninth row and first column. Note that no other armature of the matrix had its flux lowered below lever H thus insuring a good margin of signal to noise ratio.

It has been noted to be within the scope of the invention to supply a magnetic holding bias to the armatures of the matrix by making any leg of the magnetic circuit 5, 2, 6, 7 either a permanent magnet or an electromagnet by energizing a single winding apart from the row and column windings which could embrace such a leg. In this case, the circuitry and control for the column windings would be the same as for the row windings, i.e., upon closure of the switches current would be passed through both sets of normally deenergized windings in a direction to generate a magnetomotive force opposed to that supplied by the permanent magnet or the single winding. Furthermore, the circuitry for the row and column windings obviously may be interchanged without departing from the principles of operation.

Figure 7:
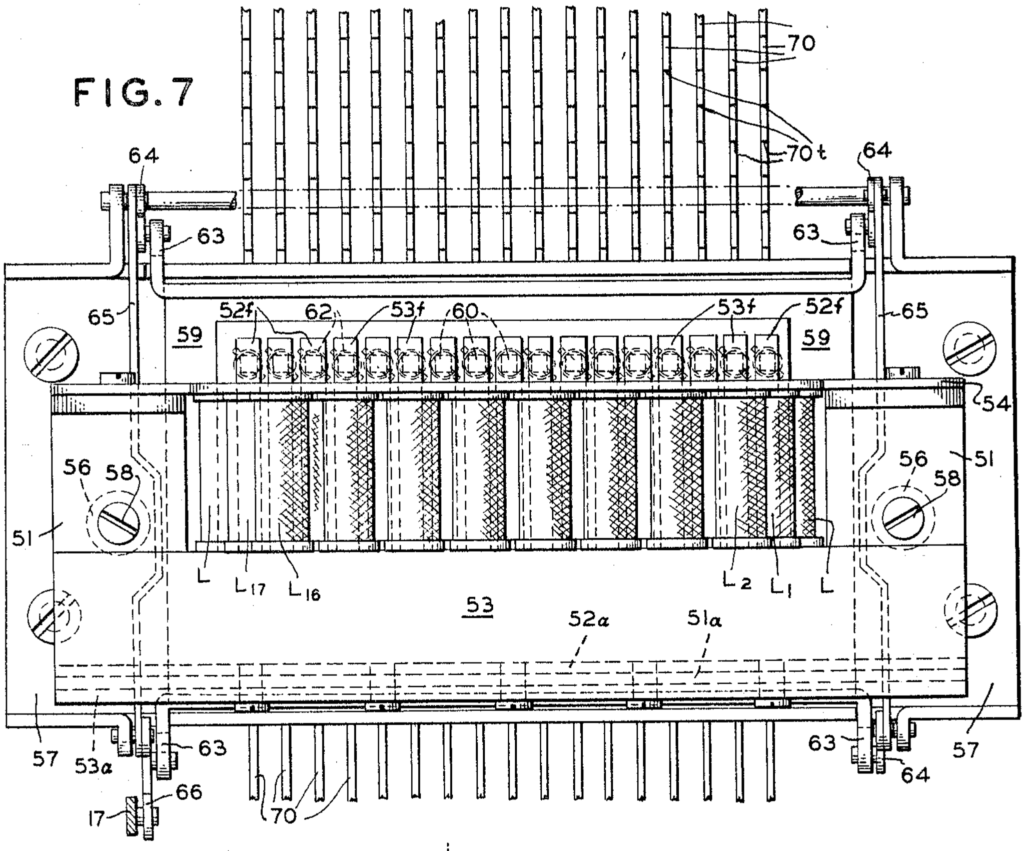
FIG. 7 is a plan view of the other form of my invention in association with actuator racks of the registering mechanism.
Figure 8:
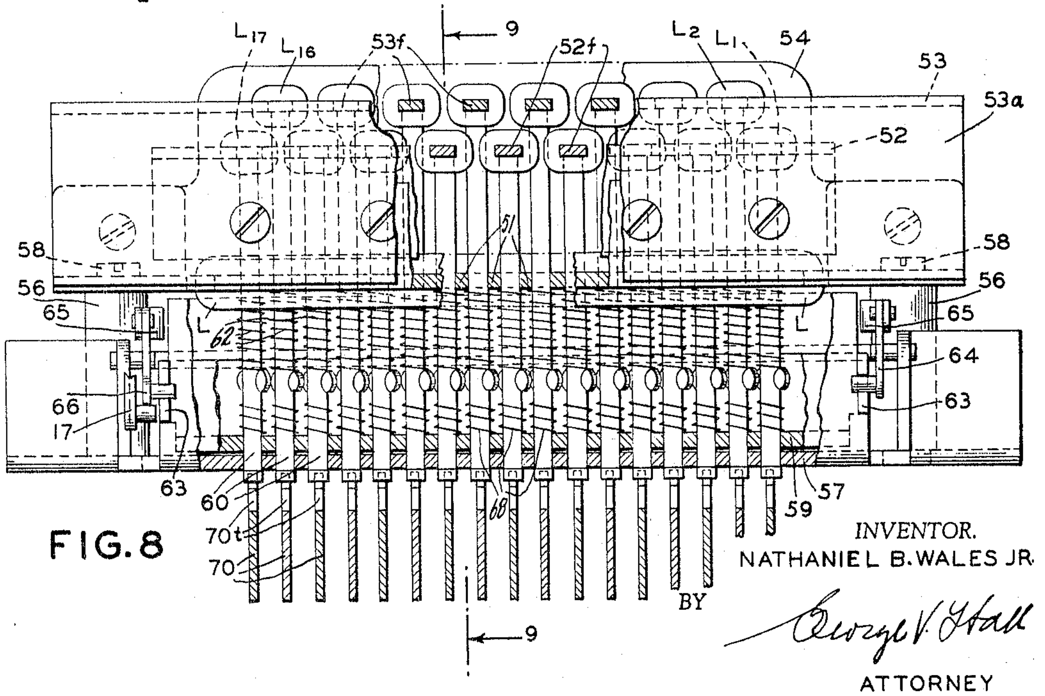
FIG. 8 is a rear elevation with parts broken away of the form of the invention shown in FIG. 7.
Figures 9, 10:
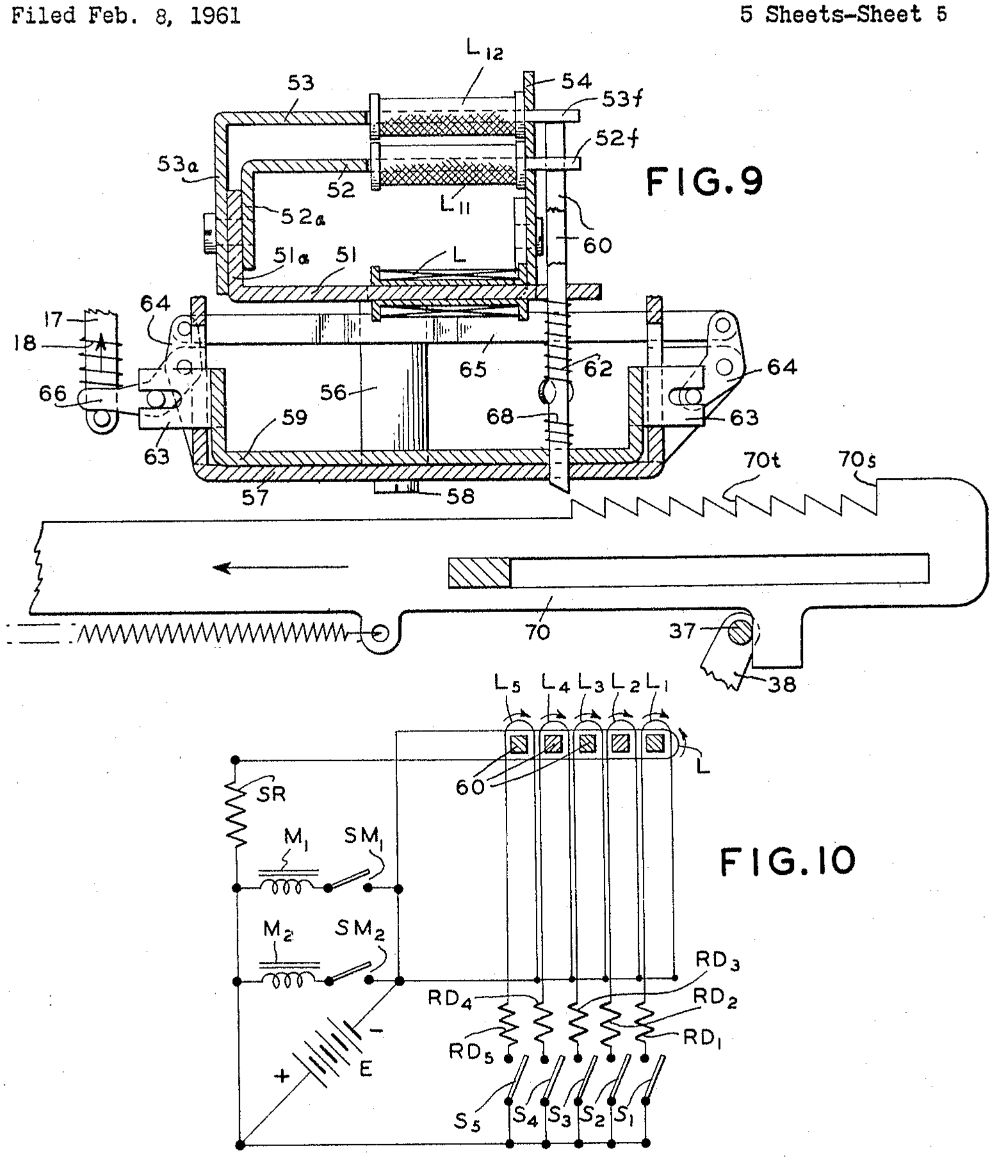
FIG. 9 is a vertical section taken on the line 9—9 of FIG. 8.
FIG. 10 is a schematic diagram of the row of electromechanical stop means disclosed in FIGS. 7–9.

Reference is now made to FIGS. 7–9 which illustrate the form of my invention comprising the single row of pole pieces with the associated armatures and structure. As shown in the drawings, provision is made for a seventeen order decimal register mechanism as would be commercially feasible.

A horizontally disposed pole plate 51 has a longitudinally extending upturned rim 51*a*. A plate 52 has a donwardly turned longitudinally extending rim 52*a* engaging the inner face of rim 51*a*, and a plate 53 has a downwardly turned longitudinally extending rim 53*a* engaging the outer face of rim 51*a*. Suitable bolt means secure rims 51*a*, 52*a*, 53*a*. Accordingly, plate 52 is disposed above pole plate 51 in parallel relationship and plate 53 is disposed above plate 52 in parallel relationship.

Plate 52 is provided with equidistantly spaced slots extending inwardly from the edge opposite rim 52*a* to form pole fingers 52*f*, and plate 53 is provided with equidistantly spaced slots directly above fingers 52*f* to form pole fingers 53*f*. Accordingly, as best seen in FIG. 8, the row of pole fingers 52*f*, 53*f* are disposed in staggered relationship.

Fingers 52*f*, 53*f* extend outwardly through a supporting plate 54 which is secured to upstanding ears of pole plate 51 adjacent its opposite ends. Pole plate 51, plate 52, plate 53, fingers 52*f*–53*f*, and plate 54 therefore comprise a rigidly contained structure.

An elongated insulated holding coil winding L embraces pole plate 51 directly at the rear of supporting plate 54, and insulated release coil windings $L_1$, $L_2$, $L_3$, etc. directly at the rear of plate 54, embrace fingers 52*f*, 53*f*, 52*f*, etc. respectively from right to left (FIGS. 7, 8).

It will be noted that the staggered relationship (FIG. 8) of pole fingers 52*f*, 53*f* permits closer lateral spacing without interference of windings $L_1$, $L_2$, $L_3$, etc.

The above magnetic pole structure is supported adjacent its ends on a pair of posts 56 which are mounted on a bed plate 57. Bolts 58 extend through pole plate 51, posts 56 and bed plate 57 thereby securing the pole structure.

A restoring plate 59, later described, normally rests on bed plate 57 between posts 56.

The upper end of a downwardly extending armature pin 60 is adapted to engage the underside of each pole finger 52*f*, 53*f* adjacent its end. Armature pins 60 are slidably journalled intermediate their ends in pole plate 51 and at their lower ends they extend loosely through clearance holes in restore plate 59 and are slidably journalled in bed plate 57. A pin 60, therefore in contact with its pole finger 52*f*, or 53*f* can complete a magnetic circuit including members 52*f*, 52, 51 and 60, or 53*f*, 51, and 60. Each pin 60 however is urged away from attraction to its pole by means of a uniform mechanical bias spring 62 between pole plate 51 and a pair of opposed protrusions on the pin.

Restore plate 59 is adapted to move pins 60 into engagment with pole fingers 52*f*, 53*f* against the tension of springs 62. Parallel vertical motion of plate 59 is provided by the cooperation of slotted ears 63 integral with plate 59, the bell cranks 64 which are journalled on bed plate 57, the cross coupling links 65, actuator arm 66, solenoid armature 17 of solenoid $M_1$ shown in FIG. 2 of the first form of the invention and return spring 18 for the solenoid armature.

The floating reset springs 68 on each pin 60 are each freely trapped between the protrusions on the pin and plate 59 so that when solenoid $M_1$ is actuated, it will move plate 59 upward first through the release stroke distance, at which point it will start compressing bias springs 62 because springs 68 are designed to be stiffer than springs 62. Eventually, the foregoing compressing motion will bring each released armature 60 into positive contact wtih its pole in spite of slight discrepancies in the lengths of armature pins 60, thereby giving each armature pin 60 the opportunity to adhere to its pole piece 52*f* or 53*f*. Deenergization of magnet $M_1$ allows spring 18 to return plate 59 to the position shown, thereby completing the restore cycle.

It will be noted that pins 60 which engage pole fingers 52*f* are of such shorter length than pins 60 engaging fingers 53*f* that all pins when in engaged position extend, an equal distance below bed plate 57.

Operatively associated with each armature pin 60 is an actuator rack 70. Racks 70 have teeth (not shown) which drive digital display wheels (not shown) in the same manner as racks 22 of FIGS. 1 and 2. Furthermore, racks 70 are controlled in forward excursions as are racks 22 upon energization of solenoid $M_2$ and are restored in the same manner.

During forward movement of racks 70, each pin 60 is adapted to be released at a predetermined time with respect to the movement of the racks (as later disclosed) and moved downwardly to engage one of nine teeth 70*t* of the associated rack 70 to arrest movement of the rack. Teeth 70*t* correspond to the digits 0–8. Accordingly, when a rack 70 is arrested, the digit wheel driven by the rack will be in the registering position corresponding to tooth 70*t* which is engaged by the associated pin 60. It will be noted that the 0 teeth 70*t* are normally in position for engagement by pins 60 and that 0 registration will release pins 60 to prevent movement of racks 70 upon operation of solenoid $M_2$. Furthermore, upon registration of 9's, pins 60 are not released and shoulders 70*s* corresponding to the 9 registering position of racks 70 are adapted to engage pins 60 when in raised position.

Referring to the schematic diagram of FIG. 10, it may be seen that the many-turn holding coil L and release coils $L_1$, $L_2$, etc. shown physically in FIGS. 7–9 are represented in FIG. 10 as a single turn for clarity. Furthermore, for simplification only five orders of holding coils are shown in lieu of the seventeen orders of FIGS. 7, 8.

Figure 11:
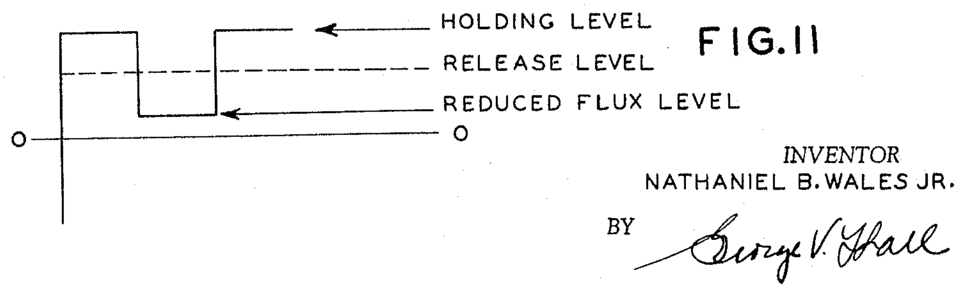
FIG. 11 is a graph showing the flux conditions effective on a row armature under holding and release conditions.

In FIG. 10, current source E passes current through the limiting resistor R and coil L thereby supplying holding flux as shown graphically in FIG. 11. Therefore with switches $S_1$, $S_2$, etc., open, all armatures 60 will be held raised in engagement with their pole fingers. It will be noted that the holding level of FIG. 11 is substantially equal to the enabling level of FIG. 4 for the reason that only one step of flux modulation is necessary to release a given armature 60.

If now a switch $S_1$, for instance, is closed, current will flow from current source E through coil $L_1$ via limiting resistor $RD_1$. However, as shown by the arrows, the current direction in coil L which produces the holding flux for armature 60 as shown in FIG. 11 is opposite to the current flowing in coil $L_1$ and consequently these magnetomotive forces will oppose one another. As a result, the flux level will be reduced as shown in FIG. 11. This reduced flux level is below the release level and consequently the associated armature 60 will be released.

In a readout operation from an electronic computer, the operation of the device of FIGS. 7–11 will be as follows:

Switch $SM_1$ (FIG. 10) is closed and opened thereby restoring all armatures 60 to holding position. Then switch $SM_2$ is closed to initiate the forward strokes of racks 70 (FIGS. 7–9). As racks 70 move forwardly, switches $S_1$, $S_2$, $S_3$, etc., will be pulsed for closure at the proper time to release the associated armatures 60 to arrest movement of the racks with the numeral wheels in positions respectively corresponding to the digital values stored in the decades of the calculator.

References is made to Patent No. 2,783,939 for the means whereby pulses may be delivered from an electronic computer to the switching means in timed relation with respect to movement of racks 70.

It will be noted that the principle of operation of the device of FIGS. 7–11 is embodied in the device of FIGS. 1–4. With reference to FIGS. 3 and 10 it will be seen that the circuitry for a single column of FIG. 3 is substantially equivalent, but for the provision of different flux levels, to that for the row of FIG. 10. Considering the units column, for instance, of FIG. 3, coil $Lo_1$, is normally energized to generate a holding flux and upon closure of switch $Sd_0$, for example, an opposing current in coil $Ld_0$ reduces the flux level at the associated pole.

A single coil L is disclosed to supply the magnetic holding bias for armatures 60. It is however within the scope of the invention to supply a holding bias by making any leg of each magnetic circuit 52*f*, 52, 51, 60 or 53*f*, 53, 51, 60 a permanent magnet or an electromagnet by energizing a single coil in lieu of the common row coil L.

I claim:

1. In an electromechanical matrix; the combination comprising a matrix of poles arranged in rows and columns, a movable armature for each pole, means for biasing each armature away from its pole, means for generating a magnetic flux at each pole adequate to hold its armature in a home position against the urge of said biasing means, means for releasing the armature at the intersection of any given row with any given column for movement by said biasing means including means for modoulating the magnetic flux at each pole of said given row and means for modulating the magnetic flux at each pole of said given column, and means for restoring said released armature to said home position.

2. In an electromechanical matrix; the combination comprising a matrix of poles arranged in rows and columns, a movable armature for each pole, means for biasing each armature away from its pole, means for generating a magnetic flux at each pole adequate to hold its armature in a home position against the urge of said biasing means, means for releasing the armature at the intersection of any given row with any given column for movement by said biasing means including means for attenuating the magnetic flux at each pole of said given row and means for attenuating the magnetic flux at each pole of said given column, and means for restoring said released armature to said home position.

3. In an electromechanical matrix; the combination comprising a matrix of magnetic core pieces arranged in rows and columns and each having a pole, a moveable armature for each pole, means for biasing each armature away from its pole, a winding for each row and common to all of the cores of said row, a winding for each column and common to all of the cores of said column, means for supplying current to said windings, means for generating a holding magnetic flux at each pole adequate to hold its armature in a home position against the urge of said biasing means, means for controlling current flow in the winding of any given row and in the winding of any given column to attenuate the magnetic flux at the pole at the intersection of said given row and said given column to release the armature of said pole for movement by said biasing means, and means for restoring said released armature to said home position.

4. The invention according to claim 3; wherein said means for generating a holding magnetic flux at each pole comprises controlling current flow in said windings.

5. The invention according to claim 3; wherein said means for controlling current flow in the winding of any given row and in the winding of any given column to attenuate the magnetic flux at the pole at the intersection of said given row and said given column includes means for passing current in a given direction through one of said windings.

6. In an electromechanical matrix; the combination comprising a matrix of magnetic core pieces arranged in rows and columns and each having a pole, a movable armature for each pole, means for biasing each armature away from its pole, a winding for each row and common to all of the cores of said row, a winding for each column and common to all of the cores of said column, means for supplying current to said windings, means for generating a holding magnetic flux at each pole adequate to hold its armature in a home position against the urge of said biasing means, means for releasing the armature at the intersection of any given row with any given column for movement by said biasing means including means for modulating current flow in the winding of said given row and in the winding of said given column, and means for restoring said released armature to said home position.

7. In an electromechanical matrix; the combination comprising a matrix of magnetic core pieces arranged in rows and columns and each having a pole, a movable armature for each pole, means for biasing each armature away from its pole, a winding for each row and common to all of the cores of said row, a winding for each column and common to all of the cores of said column, means for supplying current to said windings, means for controlling current flow in said windings to generate a holding magnetic flux at each pole adequate to hold its armature in a home position against the urge of said biasing means, means for releasing the armature at the intersection of any given row with any given column for movement by said biasing means including attenuating current flow in the winding of said given column and causing current flow in the winding of said given row, and means for restoring said released armature to said home position.

8. In an electromechanical matrix; the combination comprising a matrix of magnetic core pieces arranged in rows and columns and each having a pole, a movable armature for each pole, means for biasing each armature away from its pole, a winding for each row and common to all of the cores of said row, a winding for each column and common to all of the cores of said column, means for supplying current to said windings, means for passing current in a given direction through the winding of each column to generate a holding magnetic flux at each pole adequate to hold its armature in a home position against the urge of said biasing means, means for releasing the armature at the intersection of any given row with any given column for movement by said biasing means including means for passing current opposite to said given direction through the winding of said given row and means providing a path for current flow in parallel with the winding of said given column, and means for restoring said released armature to said home position.

9. In an electromechanical matrix; the combination comprising a matrix of magnetic core pieces arranged in rows and columns and each having a pole, a movable armature for each pole, means for biasing each armature away from its pole, a pair of windings for each row and common to all of the cores of said row, a pair of windings for each column and common to all of the cores of said column, means for supplying current to said windings, means for generating a holding magnetic flux at each pole adequate to hold its armature in a home position against the urge of said biasing means, means for controlling current flow in the pair of windings of any given row and in the pair of windings of any given column to attenuate the magnetomotive force at the pole at the intersection of said given row and said given column to release the armature of said pole for movement by said biasing means, and means for restoring said released armature to said home position.

10. In an electromechanical matrix; the combination comprising a matrix of magnetic core pieces arranged in rows and columns and each having a pole, a movable armature for each pole, means for biasing each armature away from its pole, a pair of windings for each row and common to all of the cores of said row, a pair of windings for each column and common to all of the cores of said column, means for supplying current to said windings, means for passing current in a given direction through one winding of each column to generate a holding magnetic flux at each pole adequate to hold its armature in a home position against the urge of said biasing means, means for passing current in said given direction through the other winding of each column to generate a magnetomotive force at each pole adequate to hold its armature in said home position against the urge of said biasing means, means for releasing the armature at the intersection of any given row with any given column for movement by said biasing means including means for passing current opposite to said given direction through each winding of said given row and means providing a path for current flow in parallel with each winding of said given column, and means for restoring said released armature to said home position.

11. In a device of the character described: a magnetic pole structure having a plurality of pole fingers; a movable armature for each finger; means for biasing each armature away from its finger; a winding common to all of said fingers; a control winding for each finger; means for passing current in a given direction through said common winding to generate a holding magnetic flux at each finger adequate to hold its armature in engagement therewith against the urge to said biasing means; means for releasing any given armature for movement by its biasing means including means for passing current opposite to said given direction through the control winding of the associated finger; and means for restoring said released armature to engagement with its finger.

12. In a device of the character described: a magnetic pole plate; a plurality of pole fingers on said plate; a movable armature for each finger; means for biasing each armature away from its finger; a winding embracing said plate transversely of said fingers; a control winding embracing each finger; means for passing current in a given direction through said plate winding to generate a holding magnetic flux at each finger adequate to hold its armature in engagement therewith against the urge of said biasing means; means for releasing any given armature for movement by its biasing means including means for passing current opposite to said given direction through the control winding of the associated finger; and means for restoring said released armature to engagement with its finger.

13. In a device of the character described: a magnetic pole structure including a base plate, a row of pole fingers connected with said plate and spaced from a face of said plate; an armature for each finger extending through an opening in said plate, spring means for biasing each armature away from its finger, a winding embracing said plate transversely of said fingers; a control winding embracing each finger; means for passing current in a given direction through said plate winding to generate a holding magnetic flux at each finger adequate to hold its armature in engagement therewith against the urge of said spring means; means for releasing any given armature for movement by said spring means including means for passing current opposite to said given direction through the control winding of the associated finger; and means for restoring said released armature to engagement with its finger.

14. The invention according to claim 13; said row of pole fingers being staggered.

15. The invention according to claim 13; the alternate pole fingers being in different planes respectively and said planes being parallel to said face of said plate.

References Cited by the Examiner

UNITED STATES PATENTS

| | | | |
|---|---|---|---|
| 2,170,694 | 8/1939 | Perry | 317—123 X |
| 2,226,856 | 12/1940 | Gunter | 317—155 |
| 2,814,031 | 11/1957 | Davis. | |
| 2,907,986 | 10/1959 | Rajchman | 317—123 X |
| 2,932,007 | 4/1960 | Hense | 340—166 X |
| 3,049,990 | 8/1962 | Brown et al. | 101—93 |
| 3,119,556 | 1/1964 | Wagemann | 234—115 |

SAMUEL BERNSTEIN, *Primary Examiner.*

WALTER L. CARLSON, *Examiner.*